(12) United States Patent
Lohmar et al.

(10) Patent No.: US 8,467,333 B2
(45) Date of Patent: Jun. 18, 2013

(54) RECEIVER AND RECEIVER CONTROL METHOD

(75) Inventors: Thorsten Lohmar, Aachen (DE); Uwe Horn, Aachen (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 977 days.

(21) Appl. No.: 11/816,224

(22) PCT Filed: Feb. 15, 2005

(86) PCT No.: PCT/EP2005/001517
§ 371 (c)(1),
(2), (4) Date: Aug. 14, 2007

(87) PCT Pub. No.: WO2006/086997
PCT Pub. Date: Aug. 24, 2006

(65) Prior Publication Data
US 2008/0152040 A1    Jun. 26, 2008

(51) Int. Cl.
*H04W 4/00* (2009.01)
*H04L 12/28* (2006.01)
*H04J 3/26* (2006.01)
*H04H 60/09* (2008.01)
*H04N 7/18* (2006.01)
*H04N 7/173* (2011.01)

(52) U.S. Cl.
USPC .......... 370/328; 370/390; 370/432; 455/3.04; 725/81; 725/123

(58) Field of Classification Search
USPC .............. 370/310.2–314, 328–332, 340–350, 370/390, 432; 455/3.04–3.06; 725/81, 123; 714/748–750
See application file for complete search history.

(56) References Cited

U.S. PATENT DOCUMENTS 5,862,451 A   1/1999   Grau et al.
6,539,205 B1  3/2003   Wan et al.
(Continued)

FOREIGN PATENT DOCUMENTS
JP    2003-348186 A    12/2003

OTHER PUBLICATIONS

Paila, T. et al. FLUTE—File Delivery over Unidirectional Transport, Network Working Group: RFC 3926, Oct. 2004.

(Continued)

*Primary Examiner* — Un C Cho
*Assistant Examiner* — Jeremy Costin (57) ABSTRACT

A method of controlling a receiver that is arranged to operate in a reception operating mode for receiving an amount of data in a transmission from a sender and in one or more further operating modes, the method comprising: setting an internal transmission-over indicator to an initial value at the beginning of the transmission and subsequently adapting the internal transmission-over indicator in the course of the transmission, monitoring the internal transmission-over indicator in the course of the transmission in order to determine whether a transmission-over condition is fulfilled, and, in response to determining that the transmission-over condition is fulfilled, leaving the reception operating mode for entering one of the one or more further operating modes.

10 Claims, 3 Drawing Sheets

U.S. PATENT DOCUMENTS

| | | | |
|---|---|---|---|
| 2003/0174645 A1* | 9/2003 | Paratainen et al. | 370/229 |
| 2004/0057394 A1 | 3/2004 | Holtzman | |
| 2004/0180675 A1 | 9/2004 | Choi et al. | |
| 2005/0182995 A1* | 8/2005 | Curcio et al. | 714/748 |
| 2005/0198343 A1* | 9/2005 | Yoshimura et al. | 709/231 |
| 2005/0216812 A1* | 9/2005 | Leon et al. | 714/748 |
| 2006/0023652 A1* | 2/2006 | Vedantham et al. | 370/312 |
| 2006/0023732 A1* | 2/2006 | Vedantham et al. | 370/432 |
| 2006/0067353 A1* | 3/2006 | Pekonen et al. | 370/432 |

OTHER PUBLICATIONS

Luby, M. et al. Layered Cody Transport (LCT) Building Block., Network Working Group; RFC 3451, Dec. 2002.

3GPP. 3rd Generation Partnership Project Technical Specification Group Services and System Aspects; Multimedia Broadcast/Multicast Service; Protocols and Codecs (Release 6)TS 26.346 V1.5.0 (Nov. 2004).

* cited by examiner

RECEIVER AND RECEIVER CONTROL METHOD

FIELD OF THE INVENTION

The present invention relates to a method of controlling a receiver and to the receiver itself, which is arranged to operate in a reception operating mode for receiving an amount of data in a transmission from a sender and is arranged to operate in one or more further operating modes.

BACKGROUND OF THE INVENTION

When transporting an amount of data, such as a file, from a sender to a receiver, it is known to provide for the sending of control messages from the sender to the receiver, and possibly of response control messages from the receiver to the sender, in order to control the process of communicating the amount of data. It is also known to arrange the control scheme of a receiver in such a way that it can operate in a plurality of operating modes, where there is at least one reception operating mode for receiving the above-mentioned amount of data in a transmission. The term "transmission" is used in a sense that there is a recognizable beginning and end of the data transfer.

In receivers that are arranged to operate with such a reception operating mode, there are typically further operating modes, e.g. at least an idle or stand-by mode which the receiver enters when there is no transmission underway. Naturally, there can be further operating modes, e.g. one or more error repair modes for repairing errors in the data received during the reception operating mode. The basic problem for receivers of this kind is to have a defined transition from one mode (or state) to another.

In connection with the transition from the reception operating mode into a different mode, it is known to provide end-of-transmission signaling from the sender to the receiver. In other words, the sender sends a predetermined message that tells the receiver that the transmission is over. As an example, in a data unit based communication, the final data unit of the transmission can contain a specific flag or information element that informs the receiver that the given data unit is the final data unit of the transmission. However, the sending of end-of transmission messages suffers from the problem that such messages could get lost in the course of the transmission, which leads to an undefined state at the receiver, in the sense that the receiver remains in the reception operating mode, although there is no more data to be received.

OBJECT OF THE INVENTION

The object of the present invention is to provide an improved method of controlling a receiver arranged to operate in a reception operating mode and one or more further operating modes, and an accordingly improved receiver.

SUMMARY OF THE INVENTION

In accordance with the present invention, an internal transmission-over indicator is set, adapted and monitored in the receiver, and if the internal transmission-over indicator fulfils a transmission-over condition, then the reception operating mode is left for entering one of the one or more further operating modes.

In this way the receiver is on its own capable of determining the end of the transmission and consequently capable of performing a change in operating mode, independently of specific signaling from the sender. This provides the significant advantage that a change in operating mode in the receiver occurs in a defined and predictable manner, even if there are no end-of transmission messages from the sender, or if these end-of-transmission messages are not delivered reliably.

The obvious solution to the problem of unreliable delivery of end-of transmission messages is to let the receiver acknowledge the correct receipt of the end-of transmission message. If the sender does not receive such an acknowledgment within a given time, it may repeat the sending of an end-of transmission message until an acknowledgement is received. The present invention departs from this obvious solution by enabling the receiver to determine an end-of transmission condition on its own, by monitoring an internal parameter. Therefore, the change in operating mode in the receiver does not necessarily depend on receiving a control message from the sender.

The concept of the present invention is applied in a particularly advantageous way in receivers that are arranged to receive point-to-multipoint transmissions, i.e. broadcast or multicast transmissions. Namely, in point-to-multipoint environments, it is often not possible or not desirable to have the receivers send acknowledgment messages to a sender for acknowledging the correct receipt of an end-of transmission message. Namely, if a large number of receivers send such acknowledgments, a so-called acknowledgment implosion can occur at the sender. Therefore, the present invention provides a mechanism that can ensure a reliable and predictable change in operating mode, even in a point-to-multipoint receiver.

According to an especially preferred application of the present inventive concept, the invention can be used in the context of a so-called MBMS (Multimedia Broadcast/Multicast Service) System as e.g. outlined in 3GPP TS 26.346.

BRIEF DESCRIPTION OF FIGURES

The preferred embodiments will be described with reference to figures, where.

DETAILED DESCRIPTION OF PREFERRED EMBODIMENTS

Figure 1:
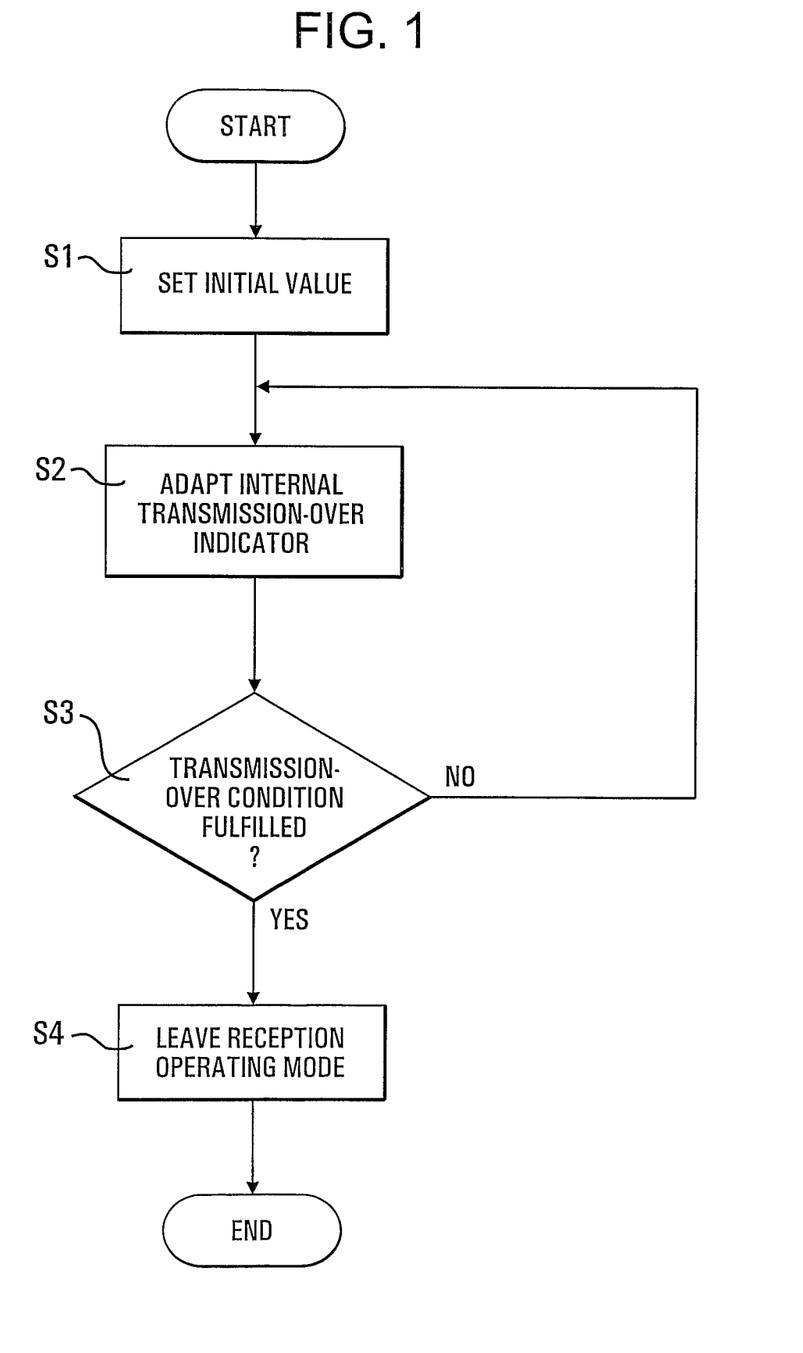
FIG. 1 shows a flowchart of a basic method embodiment of the present invention.

FIG. 1 shows a flowchart that describes a basic embodiment of the method of the present invention. The control method of FIG. 1 is applied to a receiver that is arranged to operate in a reception operating mode for receiving an amount of data in a transmission from a sender, and is arranged to operate in one or more further operating modes. In the reception operating mode, the receiver sets an internal transmission-over indicator to an initial value, preferably at the beginning of the transmission, see step S1. Subsequently, in step S2, the internal transmission-over indicator is adapted. In step S3, the receiver monitors the internal transmission-over indicator in order to determine whether a transmission-over condition is fulfilled. If no transmission-over condition is fulfilled, the routine loops back to step S2, 5 such that steps S2 and S3 are repeated in the course of the transmission, until a transmission-over condition is fulfilled.

If a transmission-over condition is fulfilled in step S3, then the routine proceeds to step S4, in which the reception operating mode is left, in order to enter one of the one or more further operating modes.

The internal transmission-over indicator can be chosen in any suitable or desirable way. For example, the internal transmission-over indicator can be the output of a timer, or it can be the output of a data amount counter. The transmission-over condition will depend on the type of indicator that is being used. For example, if the transmission-over indicator is a timer output, then the transmission-over condition can be the reaching of a certain time value (e.g. when the timer reaches zero in the event of a count-down, or when the timer reaches a set upper limit value in the event of a count-up). If the transmission-over indicator is the output of a data amount counter, then the transmission-over condition can e.g. be the reaching of a given lower value (e.g. zero) in the event of a count-down, or the reaching of a predetermined upper limit value in the event of a count-up.

It is furthermore noted that embodiments of the present invention can use more than one transmission-over indicator in parallel or in conjunction. An example of a parallel use is if a timer and a data amount counter are used and the reception operating mode is left if one of the two indicators fulfils a respective transmission-over condition. An example of the use in conjunction is if the reception operating mode is left only if both indicators fulfill their respective transmission-over condition. Using both a timer and a data amount counter in any case increases the reliability.

The setting of the initial value of the internal transmission-over indicator can be done in such a way that the initial value is a fixed value stored in the receiver. This is e.g. useful in case the sender is known or expected to always send transmissions of the same size. Another example for setting the initial value to a fixed value, is if the adapting of the internal transmission-over indicator is done in a count-up procedure from a known start value, such as zero.

However, in accordance with a preferred embodiment of the present invention the setting of the internal transmission-over indicator to an initial value will depend on transmission initial information that the receiver receives from the sender. Such transmission initial information will generally provide information on the magnitude or size and/or duration of the transmission. Preferably, the transmission initial information is one or both of a parameter indicative of the total transmission time for the amount of data to be sent, and a parameter indicative of the size of the amount of data itself. In other words, the sender can e.g. send an estimation of the total transmission time to the receiver and/or can send a parameter that indicates how much data is to be sent. The receiver is arranged to calculate the initial value for the internal transmission-over indicator based on the received information. For example, if the transmission-over indicator is the output of a timer, then the received total transmission time can be directly used as an initial value for a count-down timer. If the size of the amount of data is received as initial information, the receiver is arranged to calculate a time value based on this volume of data and a known or estimated transmission rate, and this calculated time value e.g. serves as an initial value for a count-down timer.

Like the setting of the internal transmission-over indicator, the adapting of the internal transmission-over indicator can also be basically chosen as is suitable or desirable. Naturally, there is an interdependence of the procedure for initially setting the indicator, for adapting the indicator and for choosing the transmission-over condition. However, basically, the adapting can be a count-up procedure or a count-down procedure.

Furthermore, the adapting can e.g. be done in a completely fixed manner, i.e. incrementing or decrementing a timer or data amount counter by a fixed value. Such a concept of adapting the internal transmission-over indicator in a fixed manner is suitable in situations where the behavior of the connection between sender and receiver is known to remain unchanged or expected to remain unchanged or to only change very little. However, in situations where the communication conditions are known to vary in the course of time or expected to vary in the course of time, it is preferable to adapt the internal transmission-over indicator in dependence on transmission progress information received from the sender. The transmission progress information can be chosen in any suitable or desirable way, and can e.g. be a parameter indicative of the remaining transmission time, and/or a parameter indicative of the size of data that remains to be sent. As an example, if the output of a timer is used as the internal transmission-over indicator, and the adapting is basically a count-down, such that the initial value of the transmission-over indicator was an expected overall transmission time, then if the momentary value of the internal timer is different from the remaining transmission time indicated by the sender, then the receiver can appropriately adapt the decrement value, in order to bring the momentary timer value into line with the indicated remaining transmission time. It should be noted that the momentary value of a count-down timer does not have to be equal to the indicated remaining transmission time, as the receiver can adjust the timer to add a predetermined security interval.

The method of the present invention can be implemented in any suitable or desirable way. In other words, the steps can be implemented in a receiver by means of hardware, software or any suitable combination of hardware and software. Preferably, the method of the invention is implemented as a computer program product to be loaded and executed in a programmable processor that is comprised in a control unit of a receiver. In this way, a computer program product designed to execute the method of the present invention also constitutes an embodiment of the invention.

Figure 3:
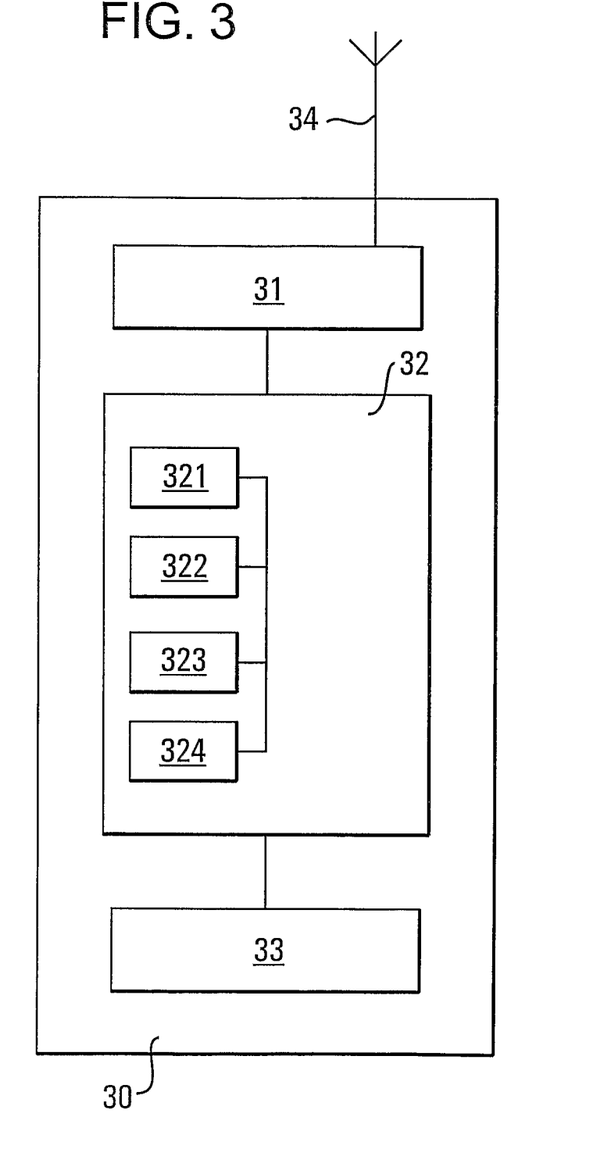
FIG. 3 shows a schematic device embodiment of the present invention.

FIG. 3 shows a schematic illustration of a receiver arranged in accordance with an embodiment of the present invention. The receiver 30 is shown as comprising a receiving unit 31, which receives signals over an antenna 34. The receiving unit 31 is connected to a control unit 32, which in turn has access to a memory 33. The receiver may comprise further conventional elements, such as a keyboard and a display, which are not shown for reasons of simplifying the description. It is also noted that despite receiver 30 of FIG. 3 being described as a wire-less device that receives signals over an antenna, the present invention is not restricted to any specific transmission technology such that it is also applicable to receivers that receive signals of wire-line connections. In this case element 34 would be a wire-line connector.

In accordance with the embodiment of FIG. 3, the control unit 32 comprises an initializer 321 for setting the internal transmission-over indicator to an initial value at the beginning of a transmission, an adaptor 322 for adapting the internal transmission-over indicator in the course of the transmission, a monitor 323 for monitoring the internal transmission-over indicator in the course of the transmission, in order to determine whether a transmission-over condition is fulfilled, and a mode changer 324 for leaving the reception operating mode and entering one of the one or more further operating modes in response to the monitor 323 determining that the transmission-over condition is fulfilled.

The elements 321-324 can be provided as hardware elements, software elements or a combination of hardware and software elements. Preferably, they are embodied as computer code parts of a computer program product executed in a programmable processor that is contained in control unit 32.

In this way, the elements 321-324 are able to implement the method described in FIG. 1. In order to implement the preferred embodiments of the inventive method, the initializer 321 is preferably arranged to take into account transmission initial information received from the sender, and the adaptor 322 is preferably arranged to take into account transmission progress information received from the sender.

Now a mode-change or state-change diagram for an embodiment of the present invention will be described with reference to FIG. 2. It is noted that the description will sometimes make reference to the example of MBMS and to RfCs 3926 and 3451, but this only serves to indicate a preferred application of the state-change diagram of FIG. 2, without being limiting. Namely, the state-change diagram shown in FIG. 2 can be applied in the context of any generic receiver that is able to implement the states or operating modes referred to as 1-7 in the following.

Reference numeral 1 relates to an idle or standby mode, in which the receiver is or waits to be initialized for receiving a transmission, and in which the basic initialization takes place. In the example of MBMS, the receiver is initialized and bound to one or more specific down-load channels (IP Multicast Address/Port Number and Source Address). The IP Multicast address and the address/port number identify one MBMS bearer.

Reference numeral 2 indicates a down-load mode for receiving one or more files. State 2 is an example of a reception operating mode described previously. In the example of MBMS, state 2 is an MBMS down-load receiving state, in which the receiver is engaged in the reception of MBMS down-load data. This MBMS down-load data is transported using e.g. the FLUTE (File Delivery over Uni-Directional Transport) protocol as specified e.g. in RfC 3926.

Reference numeral 3 describes a point-to-point file repair state, in which file repair data is received by the receiver over a point-to-point connection. In the example of MBMS the point-to-point file repair state includes a so-called back-off timer for the file repair procedure. The back-off timer is a mechanism according to which a receiver does not immediately send a repair request to the sender, but much rather generates a random back-off time and only sends the repair request after the back-off time has expired. In this way, it can be avoided that a point-to-multipoint sender and the network are overloaded at the end of a transmission, if a large number of receivers would simultaneously send repair requests.

Reference numeral 4 describes a point-to-multipoint file repair state, in which the receiver receives repair information over a point-to-multipoint connection. In other words, the sender sends repair information over a point-to-multipoint channel, such that all of the receivers receiving information over said channel can receive the repair information. State 4 is another example of a reception operating mode described previously. The repair information can be delivered using MBMS, DVB (Digital Video Broadcasting) or any other multicast/broadcast distribution means.

Reference numeral 5 relates to a state that describes that that the receiver has determined the completeness of the reception for the one or more files received in state number 2. In the example of MBMS this state describes that the MBMS receiver has determined the completeness of the reception for one FDT (File Delivery Table) instance. No further data will be received for the specific FDT instance. It may be noted that this state does not describe the successful or correct reception of the delivered files, but only indicates complete reception.

Reference numeral number 6 is a reporting state, in which the status is described to the sender. For MBMS, reception reporting is described in 3GPP TS 26.346, see chapter 9.4. Like in the point-to-point file repair procedure, the reporting procedure in state 6 starts with setting a back-off timer, i.e. a random value chosen by the receiver. When the back-off timer has expired, an interaction is executed, i.e. the report is sent. If a point-to-point file repair procedure (state 3) was executed beforehand, the back-off timer does not have to be used in state 6.

Reference numeral 7 relates to a state that describes that that the receiver has determined the incompleteness of the reception for the one or more files received in state number 2. In the example of MBMS this state describes that the MBMS receiver has determined the incompleteness of the reception for one FDT (File Delivery Table) instance. No further data will be received for the specific FDT instance.

In the following, several state transitions between the shown states will be described.

Reference numeral 1-2 indicates a transition from state 1 to state 2, i.e. from standby to a receiving state. In the context of MBMS this transition is triggered by receiving a new FDT instance. FDT instances are identified by the LCT header extension EXT_FDT (see RfC 2936).

Reference numeral 2-2 indicates a transition from state 2 to state 2, i.e. the system remains in state 2. This indicates that further file data is to be received.

Reference numeral 2-3 is a transition from the receiving state to the point-to-point file repair state, which indicates that no further file data is to be expected, because the transmission in state 2 is over. However, the receiver has identified that there is a repair-worthy error in one or more of the received files and that the procedure is to be continued with the point-to-point file repair procedure. In the example of MBMS, the configuration parameters for the point-to-point file repair are provided as a separate file in or as part of the FDT instance (e.g. identified by a MIME type, or generally configured via the initial MBMS Service Description).

Reference numeral 2-4, similar to the transition from state 2 to state 3, describes the transition from state 2 to state 4 and is performed if the receiver determines that the transmission is over and there are repair-worthy errors in one or more files. In the example of MBMS, the configuration parameters of the point-to-multipoint file repair procedure are provided as a separate file in or as part of the FDT instance (e.g. identified by a MIME type, or generally configured via the initial MBMS Service Description).

It may be noted that the state 2 may contain a decision procedure for deciding which repair state to enter into. This decision procedure can depend on a preset configuration, or can depend on the type and/or number of errors detected. For example, the sender may provide an indication into which repair state to enter, and the decision procedure in the receiver can then decide to switch into the indicated state, or if no indication is present, into a default state, which is typically the point-to-point repair state.

Reference numeral 2-5 indicates a transition from the receiving state 2 to the completion state 5, which can be performed e.g. if state 2 determines that there is no need for file repair, or the above-mentioned decision procedure may be arranged such that file repair is not to take place. In the example of MBMS, the receiver may have been able to reconstruct all files that were described in the FDT, such that the receiver could determine that the transmission is over and there is no need to wait for further incoming file data. If on the other hand the decision procedure is arranged such that file repair is not to take place, then the transition 2-5 may entail discarding all files that were not completely and correctly received.

Reference numeral 3-4 occurs if a transition from the point-to-point file repair procedure to the point-to-multipoint file repair is triggered. This can e.g. occur if the point-to-point file repair server is overloaded and therefore sends a point-to-multipoint configuration message in response to a point-to-point file repair request.

Reference numerals 3-5 and 4-5 occur if the receiver has received sufficient information to repair or reconstruct the received files and thereby has corrected the determined errors. In the example of MBMS this means that the reconstruction of all files described in the FDT is completed.

Reference numerals 3-7 and 4-7 describe a transition to state 7, which occurs if the file repair procedures have not been able to reconstruct all received files.

Reference numerals 3-3 and 4-4 describes that the receiver remains in the point-to-point or point-to-multipoint file repair state, respectively, because further repair data is being expected.

Reference numeral 4-3 occurs if no further repair data is being expected, but a complete reconstruction has not yet been achieved. In this case it is possible to configure the point-to-multipoint file repair procedure to switch to the point-to-point file repair procedure in state 3, in order to thereby obtain the missing repair data.

Reference numerals 5-1 and 7-1 indicate that states 5 and 7 are arranged to not switch to reporting, such that after complete or incomplete receipt of files, the system goes back to the standby state 1. A direct transition from states 5 and 7 to state 1 can be due to the reporting state 6 not being configured at all, or by a decision procedure in the receiver that decides that no report needs to be sent. The latter may be the case in the event of statistical reporting, i.e. the receiver does not send reports in response to receiving files but only at predetermined intervals, or reports are only sent based on one of states 5 and 7 (i.e. a report is sent if all files are successfully received, but no report is sent if some files are not successfully received; or no report is sent if all files are successfully received, but a report is sent if some files are not successfully received).

As an alternative, states 5 and 7 can be set to always switch to the report state 6, where report state 6 contains a decision procedure on whether to send a report or not.

Reference numerals 5-6 and 7-6 occur if the receiver is arranged to automatically report after receiving files, or a decision procedure has made the decision to issue a report. 6-6 describes a situation where the receiver has problems connecting to the report destination (e.g. the sender), or attempts to connect to a plurality of report destinations.

Reference numeral 6-1 describes a transition indicating that nothing further needs to be done and that the system returns to the standby state.

Figure 2:
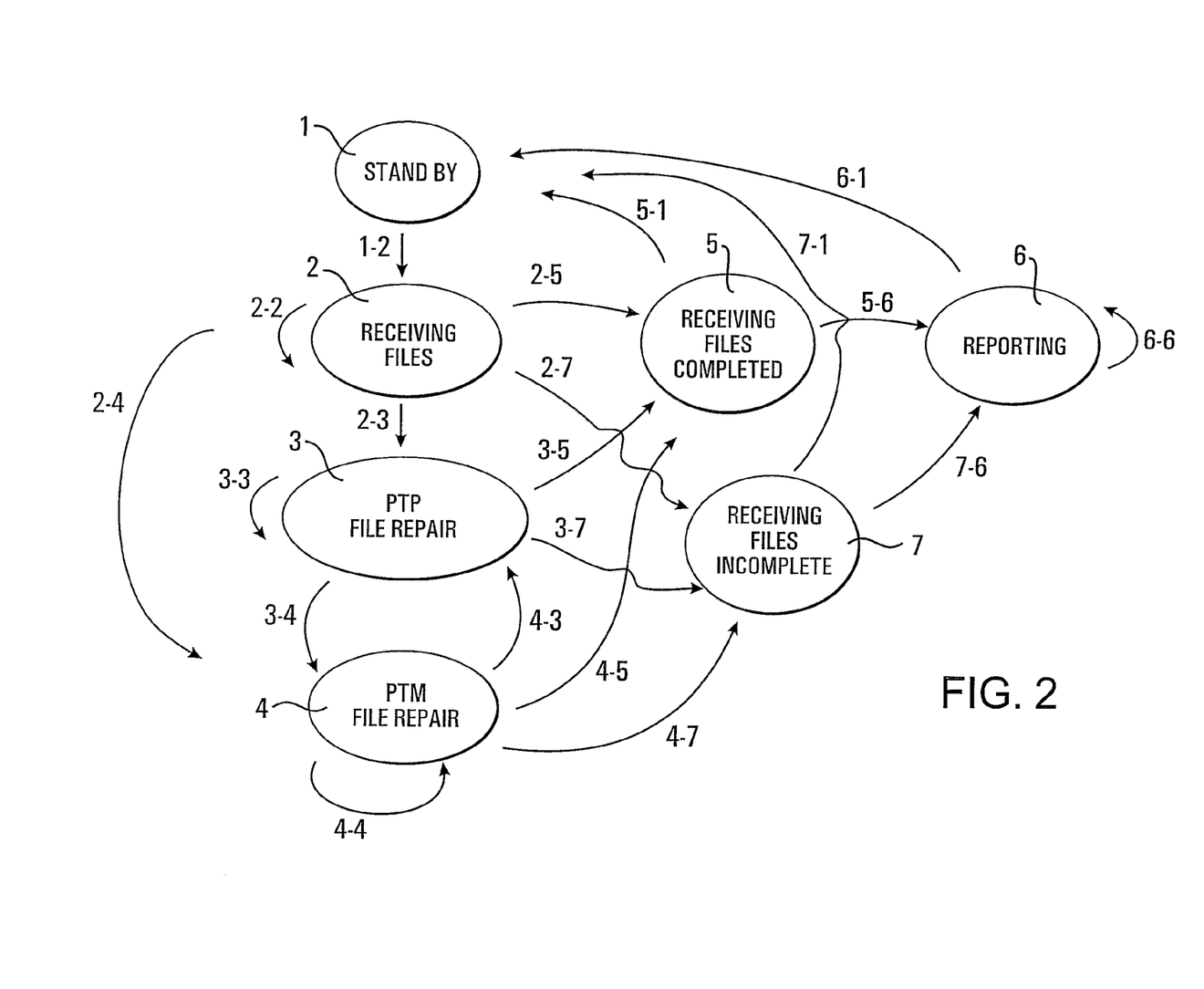
FIG. 2 shows a state-diagram indicating various operating modes and the transitions between the operating modes.

With respect to the mode-transition or state-transition diagram shown in FIG. 2, it is preferable to implement the concept of the present invention in states 2 and/or 4. In other words, in the event of applying the invention to state 2, the reception operation mode of the invention is a file reception mode for receiving one or more files, and the further operating modes comprise one or more error repair modes, such as the point-to-point file repair mode 3 and the point-to-multipoint file repair mode 4. After leaving state 2, the system can also enter the files completed state 5 or the incomplete state 7.

When applying the concept of the invention to state 4, the reception operating mode is a first repair mode for receiving repair data in a point-to-multipoint transition and one of the further operating modes is a second repair mode for receiving repair data in a point-to-point transmission. After leaving state 4, the system can also enter the files completed state 5 or the incomplete state 7.

In this way, the concept of the invention can be applied to make the transitions 2-3, 2-4 and 4-3 more reliable and more predictable, independent of receiving specific end-of-transmission messages.

Now specific embodiments related to the preferred application to MBMS will be described. A basic idea in applying the inventive concept to MBMS is to bind the FDT lifetime, which is also referred to as the FDT expiration time, to the receiving state 2 for downloading files. The FDT lifetime is held as an internal transmission-over indicator in the receiver, and when this internal lifetime indicator expires, the receiver (i.e. MBMS user equipment) will leave the receiving state 2 and make a transition to a file repair state 3, 4, or enter the receiving of files completed state 5 or the incomplete state 7.

In the context of MBMS it is preferable to make the setting and adapting of the internal expiration timer dependent on expiration time information available in the MBMS protocol. This expiration time information can then be used as transmission initial information and/or as transmission progress information. The available expiration time information can on the one hand be the "expire" attribute of the FDT instance (RfC 3926). The expire attribute is an XML attribute, and the FDT packets will then also include the sender current time (SCT) as defined in RfC 3451. Based on the difference between the SCT and the expire time, the receiver can adjust the internal expire timer. As the adapting of the internal expiration timer depends on the difference between the sender current time and the indicated expire attribute, a synchronization with respect to a plurality of receivers for a point-to-multipoint sender is not necessary. When FDT packets are interleaved into a MBMS down-load transmission, the SRT header value must be updated with the current time of sending the packet.

Another expiration time information available in the MBMS context is the expected residual time (ERT) option for LCT (Layered Coding Transport) headers as defined by RfC 3451. For this purpose, it is preferable that the sender be arranged to always include the expected residual time in all FDT packets. When FDT packets are interleaved into the MBMS down-load transmission the ERT value can be adjusted to the actual duration of the MBMS transmission.

Whenever the receiver receives a new FDT packet, it checks the state of its internal expiration timer in comparison to the information received in the FTD packet. It can then adapt the internal expiration timer accordingly.

FDT packets may be interleaved within the MBMS data stream to increase the reliability of the transmission. Therefore an MBMS receiver may receive several FDT packets for the same FDT instance. It is preferable to arrange the sender such that all of these FDT packets carry the appropriate expiration time information. It should be noted that the expiration time provided by the sender can vary in dependence on e.g. transmission bandwidth changes.

The sender can determine the transmission duration based on the amount of data to be sent and an expected or known bandwidth for the transmission. The sender determines the transmission duration for the FDT instance for the actual FDT construction. The sender creates the FDT considering the files and the file attributes. If the sender applies compression, the file content is compressed and only the result of the compression is considered in the next step. If the sender uses forward error correction (FEC) then the FEC is applied to the individual files and redundancy is added. The sender determines the total number of packets for the FLUTE instance. Combining the total number of packets (including headers and taking into account possible header compression) with the bandwidth of the requested MBMS bearer, the sender can determine the time to transmit all of the data via the MBMS bearer. The sender calculates the lifetime of the FDT instance (considering repetitions of the FDT instance and number of FDT packets). The sender may adjust the result, e.g. to cover for possible delay of some FLUTE packets.

Beyond the receiver's capability of adjusting its internal expiration timer based on explicit time information received from the sender, it is also possible that the receiver calculates the expiration time information from data amount values. For example, in accordance with RfC 3926 an attribute "content length" or "transfer length" can be sent from the sender to the receiver. In a preferred embodiment, the receiver is capable of calculating an expected overall transmission duration or a residual transmission duration based on the indicated content length or transfer length, using the known or estimated bandwidth of the underlying MBMS bearer.

The preceding description of preferred embodiments only serves to provide a better understanding of the invention, but is not intended to be limiting. Much rather, the scope of the present invention is defined by the appended claims. Reference numerals serve to increase legibility but are not intended to be limiting.

The invention claimed is:

1. A method of controlling a Multimedia Broadcast/Multicast Service receiver that is arranged to operate in a receiving state for receiving an amount of data in a transmission from a sender, and to operate in one or more further states, said method implemented by the Multimedia Broadcast/Multicast Server receiver comprising:
   leaving the receiving state and making a transition to a file repair state when an internal lifetime indicator expires;
   wherein the internal lifetime indicator depends on expiration time information available in a Multimedia. Broadcast/Multicast Service protocol; and
   wherein the expiration time information is an expire attribute of a File Delivery Table instance.

2. The method according to claim 1, wherein said file repair state is a point-to-point file repair state.

3. The method according to claim 2, wherein said point-to-point file repair state comprises generating a random back-off time and sending a repair request after the random back-off time has expired.

4. A Multimedia Broadcast/Multicast Service receiver that is arranged to operate in a receiving state for receiving an amount of data in a transmission from a sender, and to operate in one or more further states, said Multimedia Broadcast/Multicast Service receiver being controllable to leave the receiving state and make a transition to a file repair state when an internal lifetime indicator expires, wherein the internal lifetime indicator depends on expiration time information available in a Multimedia Broadcast/Multicast Service protocol, and wherein the expiration time information is an expire attribute of a File Delivery Table instance.

5. The receiver according to claim 4, wherein said file repair state is a point-to-point file repair state.

6. The receiver according to claim 5, wherein said point-to-point file repair state comprises generating a random back-off time and sending a repair request after the random back-off time has expired.

7. A computer program product stored in a non-transitory memory and loaded into a programmable processor of a Multimedia Broadcast/Multicast Service receiver that is arranged to operate in a receiving state for receiving an amount of data in a transmission from a sender, and to operate in one or more further states, said computer program product when executed by the programmable processor is arranged to have the Multimedia Broadcast/Multicast Service receiver leave the receiving state and make a transition to a file repair state when an internal lifetime indicator expires, wherein the internal lifetime indicator depends on expiration time information available in a Multimedia Broadcast/Multicast Service protocol, and wherein the expiration time information is an expire attribute of a File Delivery Table instance.

8. The method according to claim 1, wherein the File Delivery Table instance also includes a sender current time and based on a difference between the sender current time and the expire attribute the Multimedia Broadcast/Multicast Service receiver adjusts the internal lifetime indicator.

9. The receiver according to claim 4, wherein the File Delivery Table instance also includes a sender current time and based on a difference between the sender current time and the expire attribute the Multimedia Broadcast/Multicast Service receiver adjusts the internal lifetime indicator.

10. The computer program product according to claim 7, wherein the File Delivery Table instance also includes a sender current time and based on a difference between the sender current time and the expire attribute the Multimedia Broadcast/Multicast Service receiver adjusts the internal lifetime indicator.

* * * * *

UNITED STATES PATENT AND TRADEMARK OFFICE
CERTIFICATE OF CORRECTION

PATENT NO. : 8,467,333 B2
APPLICATION NO. : 11/816224
DATED : June 18, 2013
INVENTOR(S) : Lohmar et al.

Page 1 of 1

It is certified that error appears in the above-identified patent and that said Letters Patent is hereby corrected as shown below:

In the Specification:

In Column 2, Line 65, delete "S2, 5" and insert -- S2, --, therefor.

In the Claims:

In Column 9, Line 40, in Claim 1, delete "Multimedia." and insert -- Multimedia --, therefor.

Signed and Sealed this
Eighth Day of October, 2013

Teresa Stanek Rea
*Deputy Director of the United States Patent and Trademark Office*